United States Patent
Nazarian et al.

[19]

[11] Patent Number: 5,946,158
[45] Date of Patent: Aug. 31, 1999

[54] SELF-PES LINEARITY CALIBRATION METHOD FOR MR HEAD

[75] Inventors: Ara W. Nazarian, Tustin; Thao P. Trieu; Richard K. Wong, both of San Jose, all of Calif.

[73] Assignee: Western Digital Corporation, Irvine, Calif.

[21] Appl. No.: 08/893,815

[22] Filed: Jul. 11, 1997

[51] Int. Cl.[6] .................................................. G11B 5/596
[52] U.S. Cl. .......................................... 360/77.04; 360/75
[58] Field of Search .................................... 360/77.04, 75, 360/76, 77.11, 77.12, 78.02, 77.02, 77.01, 78.04, 104

[56] References Cited

U.S. PATENT DOCUMENTS 5,457,586  10/1995  Solhjell .................................. 360/77.04
5,844,675  12/1998  Hayes et al. .......................... 360/104 X

*Primary Examiner*—Muhammad Edun
*Attorney, Agent, or Firm*—Leo J. Young; Milad Shara

[57] ABSTRACT

The invention is a method of calibrating a position error signal (PES) to overcome the problem of a measured displacement or PES that varies as a non-linear function of real displacement when the read transducer is positioned to either side of a null position where the PES equals zero. The PES is notably nonlinear while reading servo burst information with a Magneto-Resistive (MR) head which has nonlinear magnetic characteristics. The method uniquely calibrates the measured PES to provide a corrected PES without requiring any knowledge of the actual displacement from the position where the measured PES equals 0. The calibration according to this method, therefore, may be performed at anytime without need for real displacement information from a servowriter or any sort of special calibration track. The method involves positioning the MR head to a plurality of predetermined, measured displacements corresponding to partial track increments of real displacement of unknown magnitude on either side of the null position, measuring a PES gain value at each of the plurality of measured displacements, and then correcting subsequent measured displacements based on the plurality of measured displacements and corresponding PES gain values. The correcting step is preferably accomplished by using the measured displacements and corresponding PES gain values to establish coefficients of a correction function $c(y)$ which substantially provides unity gain relative to real displacement over a limited range of measured displacements. The preferred correction function $c(y)$ is a partial sum Fourier series.

14 Claims, 11 Drawing Sheets

$$F = \begin{bmatrix} 1 & 1 & & 1 \\ -1 & -1 & \cdots & -1 \\ g_1 & g_2 & & g_L \end{bmatrix}^T$$

$$A = \begin{bmatrix} -\omega\sin(\omega y_1) & \omega\cos(\omega y_1) & -2\omega\sin(2\omega y_1) & 2\omega\cos(2\omega y_1) & \cdots & -N\omega\sin(N\omega y_1) & N\omega\cos(N\omega y_1) \\ -\omega\sin(\omega y_2) & \omega\cos(\omega y_2) & -2\omega\sin(2\omega y_2) & 2\omega\cos(2\omega y_2) & \cdots & -N\omega\sin(N\omega y_2) & N\omega\cos(N\omega y_2) \\ \vdots & \vdots & \vdots & \vdots & & \vdots & \vdots \\ -\omega\sin(\omega y_L) & \omega\cos(\omega y_L) & -2\omega\sin(2\omega y_L) & 2\omega\cos(2\omega y_L) & \cdots & -N\omega\sin(N\omega y_L) & N\omega\cos(N\omega y_L) \end{bmatrix}$$

$$K = [a_1 \ b_1 \ a_2 \ b_2 \ \cdots \ a_N \ b_N]^T$$

| | $-\omega SIN(\omega y)$ | $\omega COS(\omega y)$ | $-2\omega SIN(2\omega y)$ | $2\omega COS(2\omega y)$ | $-3\omega SIN(3\omega y)$ | $3\omega COS(3\omega y)$ |
|---|---|---|---|---|---|---|
| | 1 | 2 | 3 | 4 | 5 | 6 |
| 1. | 0.30 | -0.10 | -0.37 | -0.51 | -0.55 | 0.76 |
| 2. | 0.31 | 0.00 | 0.00 | -0.63 | -0.94 | 0.00 |
| 3. | 0.30 | 0.10 | 0.37 | -0.51 | -0.55 | -0.76 |
| 4. | 0.25 | 0.18 | 0.60 | -0.19 | 0.29 | -0.90 |
| 5. | 0.18 | 0.25 | 0.80 | 0.19 | 0.90 | -0.29 |
| 6. | 0.10 | 0.30 | 0.37 | 0.51 | 0.76 | 0.55 |
| 7. | 0.00 | 0.31 | 0.00 | 0.63 | 0.00 | 0.94 |
| 8. | -0.10 | 0.30 | -0.37 | 0.51 | -0.76 | 0.55 |
| 9. | -0.18 | 0.25 | -0.60 | 0.19 | -0.90 | -0.29 |
| 10. | -0.25 | 0.18 | -0.60 | -0.19 | -0.29 | -0.90 |
| 11. | -0.30 | 0.10 | -0.37 | -0.51 | 0.55 | -0.76 |
| 12. | -0.31 | 0.00 | 0.00 | -0.63 | 0.94 | 0.00 |
| 13. | -0.30 | -0.10 | 0.37 | -0.51 | 0.55 | 0.76 |

MATRIX A WHERE L=13, M=5, N=3

FIG. 11

| | 1 | 2 | 3 | 4 | 5 | 6 | 7 | 8 | 9 | 10 | 11 | 12 | 13 |
|---|---|---|---|---|---|---|---|---|---|---|---|---|---|
| 1. | 1.13 | 0.19 | -0.14 | 0.10 | 0.43 | 0.40 | 0.00 | -0.40 | -0.43 | -0.10 | 0.14 | -0.19 | -1.13 |
| 2. | 0.20 | 0.36 | 0.39 | 0.40 | 0.49 | 0.60 | 0.66 | 0.60 | 0.49 | 0.40 | 0.39 | 0.36 | 0.20 |
| 3. | -0.69 | 0.10 | 0.42 | 0.26 | -0.03 | -0.13 | 0.00 | 0.13 | 0.03 | -0.26 | -0.42 | -0.10 | 0.69 |
| 4. | -0.32 | -0.33 | -0.21 | -0.08 | 0.00 | 0.01 | 0.01 | 0.01 | 0.00 | -0.08 | -0.21 | -0.33 | -0.32 |
| 5. | 0.26 | -0.17 | -0.25 | -0.03 | 0.21 | 0.21 | 0.00 | -0.21 | -0.21 | 0.03 | 0.25 | 0.17 | -0.26 |
| 6. | 0.22 | 0.09 | -0.07 | -0.13 | -0.04 | 0.11 | 0.18 | 0.11 | -0.04 | -0.13 | -0.07 | 0.09 | 0.22 |

MATRIX PRODUCT $(A^TA)^{-1}A^T$ WHERE L=13, M=5, N=3

SELF-PES LINEARITY CALIBRATION METHOD FOR MR HEAD

BACKGROUND OF THE INVENTION

1. Field of the Invention

The present invention relates generally to rotating magnetic disk drives and, more particularly, to a method of calibrating a position error signal (PES) for accurately moving an MR head in partial track increments from a position at which the PES equals zero and where the PES varies as a nonlinear function of real displacement due to a non-linear magnetic response characteristic of the MR head.

2. Description of the Related Art

A conventional disk drive has a head disk assembly ("HDA") including at least one magnetic disk ("disk"), a spindle motor for rapidly rotating the disk, and a head stack assembly ("HSA") that includes a head gimbal assembly (HGA) with a transducer head for reading and writing data. The HSA forms part of a servo control system that positions the transducer head over a particular track on the disk to read or write information from that track.

The industry presently prefers a "rotary" or "swing-type" actuator assembly which conventionally comprises an actuator body that rotates on a pivot assembly between limited positions, a coil that extends from one side of the actuator body to interact with a pair of permanent magnets to form a voice coil motor, and an actuator arm that extends from the opposite side of the actuator body to support the HGA.

Each surface of each disk conventionally contains a plurality of concentric data tracks angularly divided into a plurality of data sectors. In addition, special servo information is provided on this disk or another disk to determine the position of the head. The most popular form of servo is called "embedded servo" wherein the servo information is written in a plurality of servo sectors that are angularly spaced from one another and interspersed between data sectors around the track. Each servo sector generally comprises a track identification (ID) field and a group of servo bursts (an alternating pattern of magnetic transitions) which the servo control system samples to align the transducer head with or relative to a particular data track. The servo control system moves the transducer toward a desired track during a coarse "seek" mode using the track ID field as a control input. Once the transducer head is generally over the desired track, the servo control system uses the servo bursts to keep the transducer head over that track in a fine "track follow" mode. The transducer generally reads the servo bursts to produce a position error signal (PES) that is 0 when the transducer is at a particular radial position. The position where the PES=0 may or may not be at the data track center, however, depending on the magnetic characteristics of the transducer, the arrangement of the servo bursts, and the formula used to calculate the PES.

For many years, the industry has used single-gap inductive thin film heads where the same transducer or gap is used for reading and writing. More recently, however, the industry has begun using a Magneto-Resistive head which requires two separate transducers—an inductive transducer for writing and a Magneto-Resistive transducer for reading. An MR head offers an advantage over an inductive head in the recovery of data in disk drives requiring high areal density. However an MR head also presents a number of disadvantages. In particular, the separate read and write transducers are necessarily spaced apart from one another along the length of the supporting structure known as a "slider." As a result, their radial separation varies as the head is moved over the disk by a swing-type actuator.

This phenomenon generally requires distinct track following procedures for reading and writing. For example, during writing the read transducer track follows at the "null" position where the PES=0 and the write transducer records the data track offset by the amount of radial separation between the read and write transducers at this cylinder. For reading, therefore, the read transducer is "micro-jogged" away from the null position in order to align the read transducer with the data track, i.e. it track follows off-null at a position where the PES≠0.

The jogging process can be troublesome, however, because the PES produced by the Magneto-Resistive transducer does not vary in linear proportion to the displacement from the position where the PES=0. This non-linear signal-to-displacement characteristic is a well known problem, but the solutions to date have a number of drawbacks as discussed below.

One known approach to calibrating the PES signal relative to displacement relies on a device called a servowriter. The servowriter is basically a jig which mounts a HDA and then mechanically moves the heads to a given reference position under control of a precision laser guided measurement system. The HDA is then driven to write the servo track information for that position. The process is repeated for as many incremental movements of the heads as are required to write all tracks across the disk. During this process, the actual displacement x from a position where the PES=0 is known while using the servowriter. This makes it relatively easy to measure the system gain as a function of the actual displacement x to generate a calibration factor. Unfortunately however, a servowriter is a very expensive piece of machinery, costing $100,000.00 or more and using this process for calibrating system gain increases the time spent by the HDA in a servowriter which adversely impacts production time and cost. Finally, it is undesirable to calibrate the PES using a servowriter because the calibration must be performed before the detailed self calibration process which the disk drive performs later in the manufacturing cycle. This is a significant disadvantage because the parameters of the servo channel may change due to adjustments in DC bias current applied to the MR transducer or other factors. Accordingly, the calibrations made with the servo writer may become inaccurate or entirely invalid.

Another approach known to these inventors involves using the servowriter to record a special "calibration track" on each surface of each disk wherein a plurality of burst pairs define null points that are radially shifted from one another by precise, fractional track amounts that collectively provide accurate information about real displacement. Such a calibration track beneficially allows for calibrating the PES signal after the drive is removed from the servowriter. Unfortunately, however, the special calibration tracks take additional time on the servowriter and occupy valuable space on the disk that could be used for data.

Accordingly, there is a need for a method of calibrating the response of the MR head which does not require a servowriter and which may be performed when the disk drive requires detailed calibration without requiring special calibration tracks.

SUMMARY OF INVENTION

In a first aspect, the present invention resides in a servo control system for a magnetic disk drive comprising a magnetic disk having a pattern of servo bursts defining concentric data tracks, an actuator, and an MR head that is carried by the actuator adjacent the magnetic disk and that generates a measured displacement y (PES signal) which varies as a non-linear function u(x) of physical displacement x from a data track center. This aspect of the invention specifically comprises a method of calibrating the measured displacement y to provide a corrected displacement z, comprising the steps of positioning the MR head to a plurality of measured displacements y relative to the data track center, measuring a gain value $g(y)=du(x)/dx$ of the MR head at the plurality of measured displacements y, and correcting the measured displacement y which varies as a non-linear function of the physical displacement x to the corrected displacement z which varies substantially as a linear function of the physical displacement x based on the plurality of measured displacement y and corresponding gain values $g(y)$. In a preferred embodiment, the correcting step comprises establishing coefficients of a corruption function $c(y)$ using the plurality of measured displacement y and corresponding gain values $g(y)$. The MR head, moreover, is preferably positioned at a plurality of measured displacements y relative to the data track center by positioning the MR head on a data track center wherein the measured displacement y equals zero and by positioning the MR head at a plurality of positions at either side of the data track center wherein the measured displacements y lie in the range of $-M$ to $+M$ fractional track increments. The gain values $g(y)$ associated with each of the measured displacements y are used as known values in the corresponding plurality of simultaneous equations which establish the coefficients of the correction function $c(y)$ used to provide a corrected displacement z that varies substantially as a linear function of actual displacement x.

BRIEF DESCRIPTION OF THE DRAWINGS

The just summarized invention may best be understood with reference to the Figures of which:

FIG. 5 shows the preferred matrices F, A, and K used to mathematically determine the best fit coefficients of the correction function $c(y)$;

FIG. 10 shows the fixed, predetermined values of matrix A for a hypothetical situation where L=13, M=5, and N=3; and FIG. 11 shows the fixed, predetermined values of the matrix product $(A^TA)^{-1}A^T A$ corresponding to the matrix A of FIG. 10.

BRIEF DESCRIPTION OF THE PREFERRED EMBODIMENTS

Figure 1:
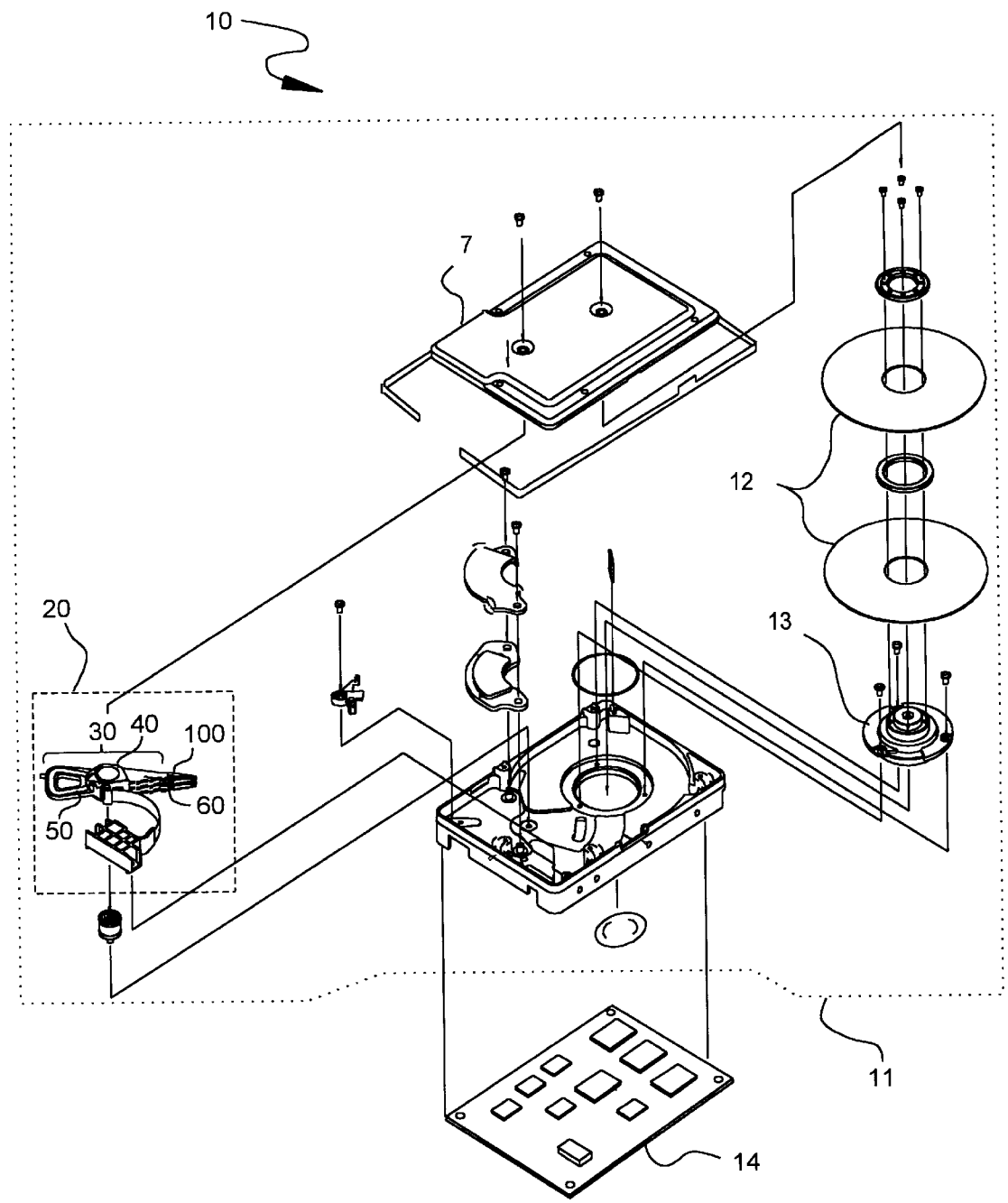
FIG. 1 is an exploded perspective view of a magnetic disk drive 10 having a head disk assembly 11 ("HDA") including a head stack assembly 20 ("HSA") which carries a Magneto-Resistive transducer over concentric data tracks and associated servo bursts on the surface of a disk 12.

FIG. 1 shows the principal components of a disk drive 10 in which a PES calibration according to the present invention may be implemented. The disk drive 10 shown is an integrated drive electronics (IDE) drive, comprising a head disk assembly (HDA) 11 and a controller circuit board 14.

The HDA 11 of FIG. 1 comprises a magnetic disk 12 (2 shown), a spindle motor 13 for rapidly rotating the disk 12, and a head stack assembly 20 located next to the disk 12. The head stack assembly 20 comprises a swing-type actuator assembly 30 having a voice coil 50, an actuator body 40, and an actuator arm 60. At least one head gimbal assembly 100 extends from each actuator arm 60 and carries a head 140 (see FIG. 1A) over the disk 12.

The head stack assembly 20 is located so that the head 140 of the head gimbal assembly 100 is biased towards and moveable over the disk 12. The HDA's storage capacity may be increased, as shown in FIG. 1, by including several disks 12 and a head stack assembly 20 having a vertical "stack" of head gimbal assemblies 100 and associated heads 140 for each surface of each disk 12, the head gimbal assemblies 100 supported by multiple actuator arm 60.

Figure 1A:
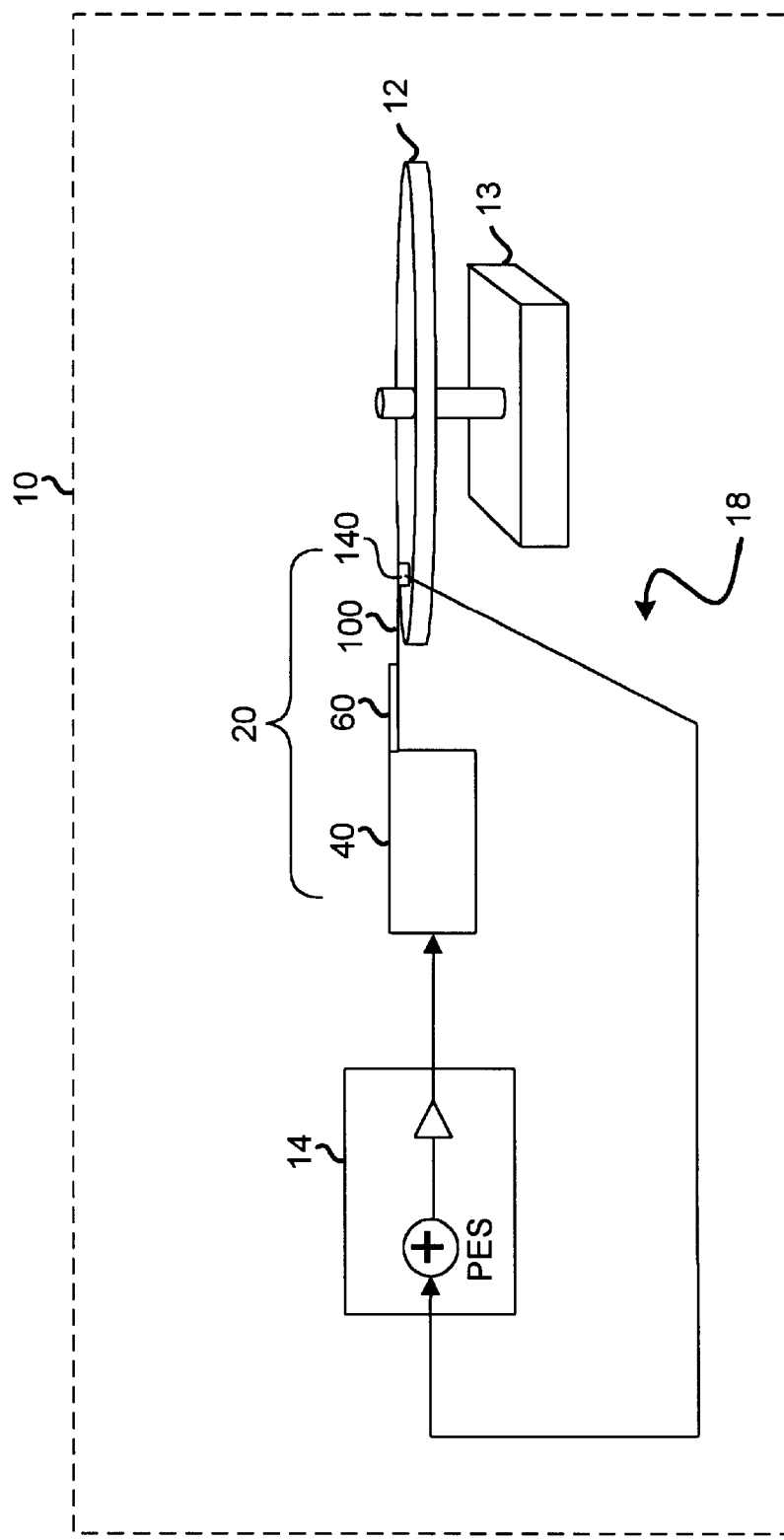
FIG. 1A is a schematic, block diagram of a servo control loop 18 used to position a transducer head 140 over a surface of a disk 12 in the disk drive 10 of FIG. 1.

FIG. 1A is a schematic, block diagram of a servo control loop 18 used to position a transducer head 140 over a surface of a disk 12 in the disk drive 10 of FIG. 1. As suggested therein, servo electronics within the controller circuit board 14 control the actuator 20 based on servo signals fed back from the transducer head 140. A detailed description of the servo control loop is unnecessary because its general operation is well known in the industry.

As explained above, a sampled servo or sectored servo is presently popular. In such an arrangement, groups or "bursts" of magnetic transitions are recorded in a radially displaced fashion within a servo sector. Where two bursts are used per data track, the servo bursts are usually designated as the "A" burst and the "B" burst. The radial displacement in such case places the A burst to one side of the data track centerline and the B burst to the other side. The A and B bursts are displaced from one another in terms of angular position such that the head passes over the A burst and then over the B burst. If the head is aligned with the data track centerline, then the head will pass over equal amounts of the A and B bursts and the servo electronics will develop a Position Error Signal (PES) equal to zero. If the head is displaced from the centerline, then the head will pass over more of the A burst or over more of the B burst so that the PES will be nonzero, the sign of the PES indicating the direction of displacement. The PES is used by the servo electronics to attain and then maintain a desired position.

The separation of the read and write transducers in a Magneto-Resistive heads has made it necessary to purposely track follow away from the null position where the PES=0. Unfortunately, however, the read transducer which detects the servo bursts is nonlinear in that the measured displacement (PES) does not correspond to real displacement as the read transducer is moved away from the null point. This nonlinear response makes it necessary to calibrate the PES as a function of real displacement in order to accurately position the MR head on either side of the null position. The calibration method of these inventors uniquely does not require any knowledge of real displacement, but rather is accomplished by measuring the gain, or value of the PES signal at each of a plurality of commanded positions. The method may be understood with reference to the following sections taken together with the drawings.

I. Theory

Figure 2:
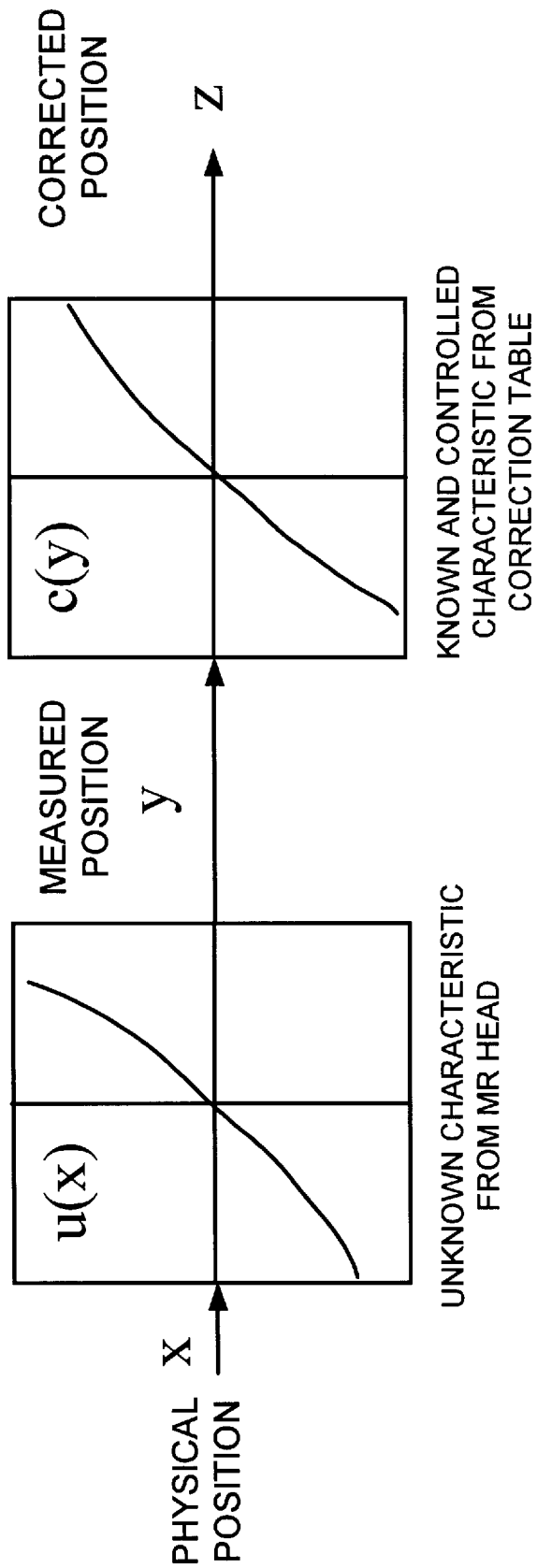
FIG. 2 is a theoretical diagram showing how an MR head which produces a PES or measured displacement y that varies as a non-linear function u(x) of actual displacement x may be corrected using a correction function $c(y)$ to provide a corrected displacement z which varies substantially as a linear function of the actual displacement x.

The following explanation relates to FIG. 2. As suggested therein, if x is the real displacement from the position where the PES equals zero and y is a measured PES, then there is some relationship between y and x which we can characterize as:

$$y = u(x) \tag{1}$$

In a read channel using a Magneto-Resistive read transducer, the relationship between real displacement x and measured PES y is not linear due, in large part, to the asymmetrical, nonlinear magnetic characteristics of the MR head. We can, however, produce a corrected PES z by applying a correction function c(y) to the measured PES y:

$$z = c(y) \tag{2}$$

In actual practice, we expect the measured PES y at the null position where y=0 such that dy/dx=1. Accordingly, as the real displacement x varies to either side of the null position where the PES=0, the gain will deviate from but will remain relatively close to unity. In order to reduce the numerical effort imposed on the correction function, therefore, we can define an intermediate difference function h(y) which equals the difference between the correction function, c(y), and the unit gain passing function, i.e.:

$$h(y) \equiv c(y) - y \tag{3}$$

We can reorder equation (3) as c(y)=y+h(y) and then replace h(y) with the Fourier series to define the correction function as follows:

$$c(y) = y + a_0 + a_1 \cos(\omega y) + b_1 \sin(\omega y) + a_2 \cos(2\omega y) + b_2 \sin(2\omega y) \ldots + a_N \cos(N\omega y) + b_N \sin(N\omega y) \tag{4}$$

where N is the order of the Fourier series, $a_0, a_1, b_1, a_2, b_2, \ldots a_N, b_N$ are the Fourier coefficients, and $\omega = \pi/2M$ where the measured PES values y of interest range from $-M$ to $+M$ fractional track increments.

We also demand that the correction function c(y) of equation (4) not cause any physical displacement while the system is track following at the null point with the measured PES y equal to zero. Therefore, we need to have the following equation to hold true:

$$c(0) = 0 \tag{5}$$

From equations (4) and (5), we can replace $a_0$ and further specify the correction function c(y) as follows:

$$c(y) = y + a_1 \cos(\omega y) + b_1 \sin(\omega y) + a_2 \cos(2\omega y) + b_2 \sin(2\omega y) + \ldots + a_N \cos(N\omega y) + b_N \sin(N\omega y) - (a_1 + a_2 + a_3 + \ldots a_N) \tag{6}$$

From equation (6), we can obtain the derivative of the correction function c(y) with respect to the measured PES y as follows:

$$dc(y)/dy = 1 - \omega a_1 \sin(\omega y) + \omega b_1 \cos(\omega y) - 2\omega a_2 \sin(2\omega y) + 2\omega b_2 \cos(2\omega y) - \ldots - N\omega a_N \sin(N\omega y) + N\omega b_N \cos(N\omega y) \tag{7}$$

The correction function c(y) should provide the corrected PES z with unity gain for all measured PES values y between $-M$ and $+M$ fractional track increments, or, in mathematical terms we would expect that:

$$\frac{dz}{dx} = 1 \qquad \text{for all } y \in [-M, +M] \tag{8}$$

or $$\frac{dc(y)}{dy} \frac{du(x)}{dx} = 1 \qquad \text{for all } y \in [-M, +M] \tag{9}$$

where du(x)/dx is a gain value that may be measured at a corresponding measured displacement y without knowledge of the real displacement x using a conventional method. The preferred method of measuring du of x/dx involves positioning the MR head at a measured displacement y, track following at that measured displacement y, injecting a single frequency sinusoidal signal into the servo control system, and measuring a response of the actuator relative to the single frequency sinusoidal signal using a digital Fourier transform (DFT).

Remember that the measured PES y is related to displacement x by equation (1), namely y=u(x). Now, we can define the measurable term, $$\frac{du(x)}{dx},$$

equal to gain g(y) at a particular measured displacement y. Then equation (9) can be rewritten as:

$$\frac{dc(y)}{dy} g(y) = 1 \qquad \text{for all } y \in [-M, +M] \tag{10}$$

By substituting equation (7) into equation (10) we have the following equation:

$$1 = g(y) \begin{bmatrix} 1 - \omega a_1 \sin(\omega y) + \omega b_1 \cos(\omega y) - 2\omega a_2 \sin(2\omega y) + \\ 2\omega b_2 \cos(2\omega y) - \ldots - N\omega a_N \sin(N\omega y) + N\omega b_N \cos(N\omega y) \end{bmatrix} \tag{11}$$

Using equation (11), we can then perform a plurality L of gain measurements $g_i$ at specific "offsets" or measured PES values $y_i$ that satisfy the following L equations:

$$1 = g_1[1 - \omega a_1 \sin(\omega y_1) + \omega b_1 \cos(\omega y_1) \ldots - N\omega a_N \sin(N\omega y_1) + N\omega b_N \cos(N\omega y_1)] \tag{11.1}$$

$$1 = g_2[1 - \omega a_1 \sin(\omega y_2) + \omega b_1 \cos(\omega y_2) \ldots - N\omega a_N \sin(N\omega y_2) + N\omega b_N \cos(N\omega y_2)] \tag{11.2}$$

$$\vdots$$

-continued $$1 = g_L[1 - \omega a_1 \sin(\omega y_L) + \omega b_1 \cos(\omega y_L) \ldots - \\ N\omega a_N \sin(N\omega y_L) + N\omega b_N \cos(N\omega y_L)] \quad (11.L)$$

where all $y_i \in [-M, +M]$, where $g_1$ is the gain measured at offset $y_1$, $g_2$ is the gain measured at offset $y_2$, and so on.

Finally, we can rearrange equations (11.1 to 11.L) to organize the unknown Fourier coefficients $a_1, b_1, a_2, b_2, \ldots a_N, b_N$ into a vector K defined by the following vector equation:

$$F = AK \quad (12)$$

where matrices F, A and K are as shown in FIG. 5.

As shown in FIG. 5, F is an L×1 matrix, A is an L×2N matrix, and K is an 2N×1 matrix where N is the selected order of the Fourier series and L is the selected number of measurements. The elements of matrix F are measured. The elements of matrix A are fixed once N, L and the measured values $y_i$ to $y_L$ corresponding to L are identified. The only unknowns, therefore, are the elements of the (2N)×1 vector K which stores the Fourier coefficients. Accordingly, we can use the following equation to compute the best set of coefficients with the Least Square method:

$$K_{LS} = (A^T A)^{-1} A^T F \quad (13)$$

Once computed, the coefficients in $K_{LS}$ can be applied to equation (6) which may then be used for correcting measured PES values y to corrected values z.

II. Numeric Example Using Hypothetical MR Head

Figure 6:
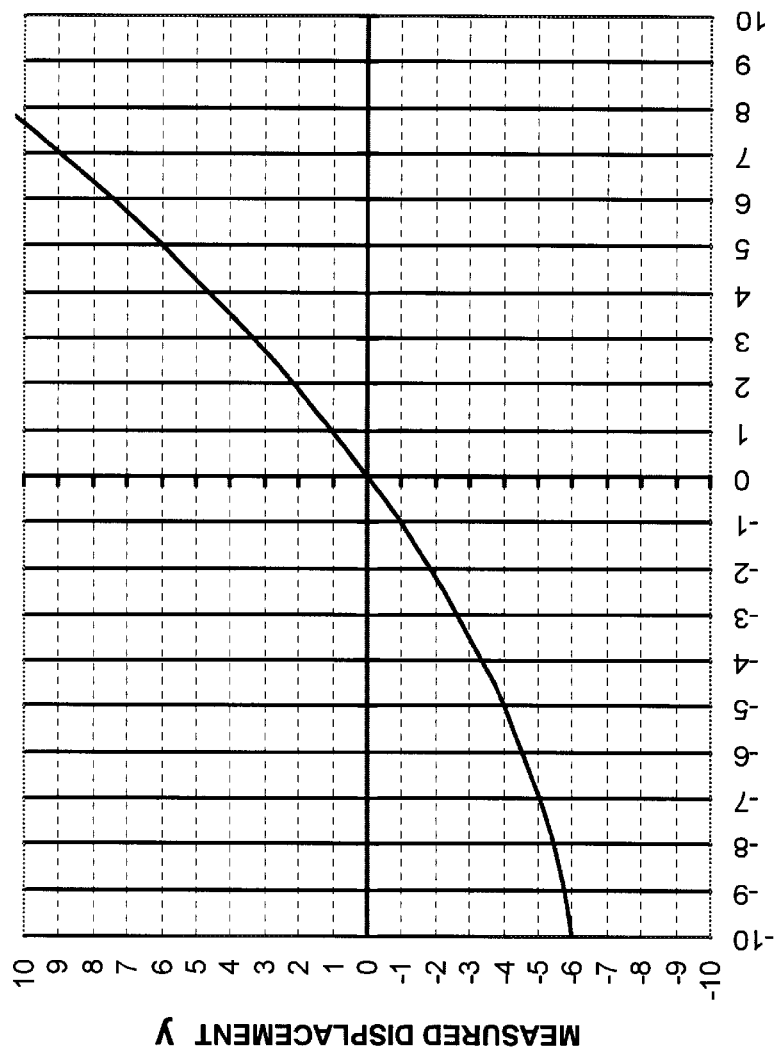
FIG. 6 is a graph of measured displacement y versus real displacement x for a hypothetical MR head wherein $y=u(x)=0.015x^2+x$.

The invention may be best understood with reference to a hypothetical MR head which generates, as shown in FIG. 6, a measured displacement y as a particular, nonlinear function of real displacement x. Ordinarily, we would not know how the MR head behaves nor could we characterize its behavior as a simple first order polynomial. In order to calculate gain values that would normally be measured, however, we have arbitrarily defined the behavior our MR head in accordance with the following polynomial equation:

$$y = u(x) = 0.015x^2 + x \quad (14)$$

Figure 7:
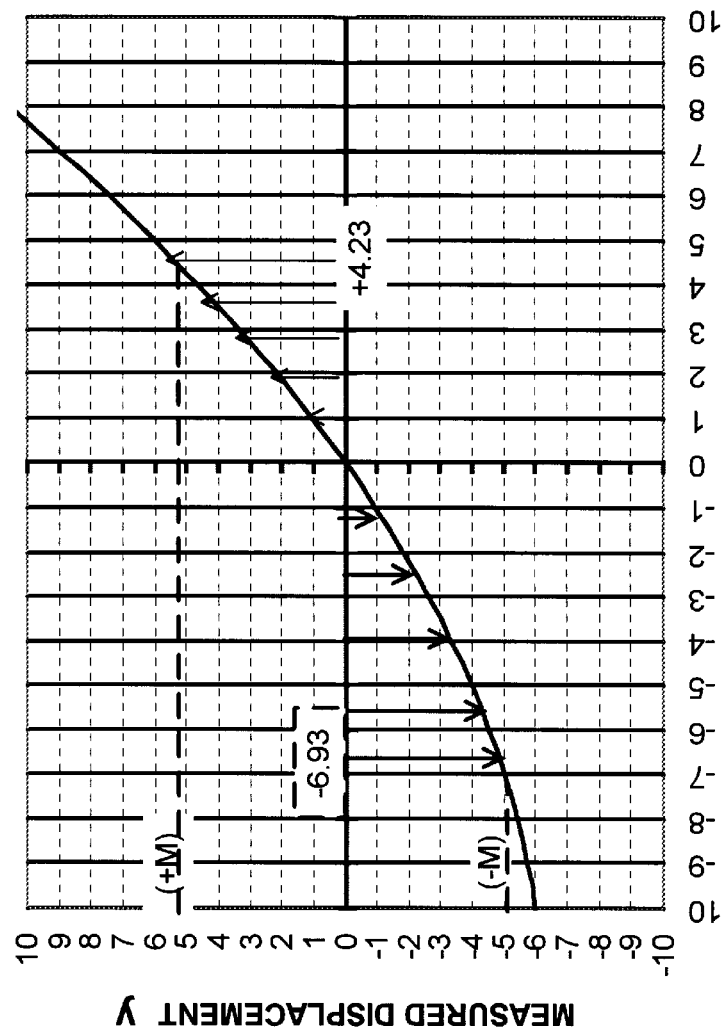
FIG. 7 is a graph of the same hypothetical MR head represented by FIG. 6 emphasizing the non-linear relationship between real displacement x and measured displacement y within a range of interest equal to ±M fractional track increments.
Figure 8:
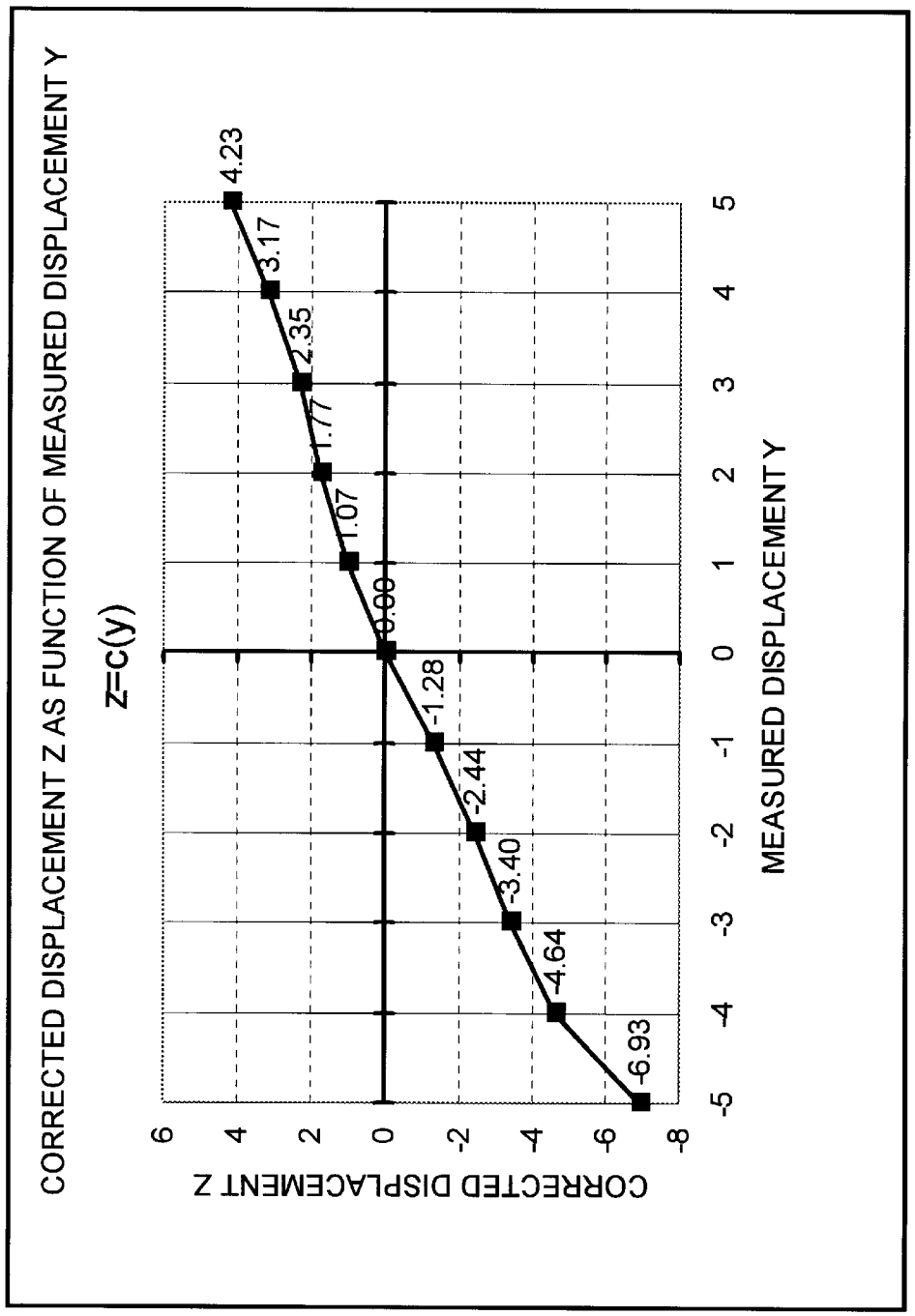
FIG. 8 is a graph of the correction function $z=c(y)$ showing corrected displacement z as a function of measured displacement y.

We have also arbitrarily decided to calibrate this MR head for off track movement of ±5 fractional track increments of measured displacement y, i.e. M=5. As shown in FIG. 7, the measured displacements y between −5 and +5 fractional track increments do not correspond to real displacements x of equal value. In mathematical terms, $dy/dx \neq 1$.

Figure 9:
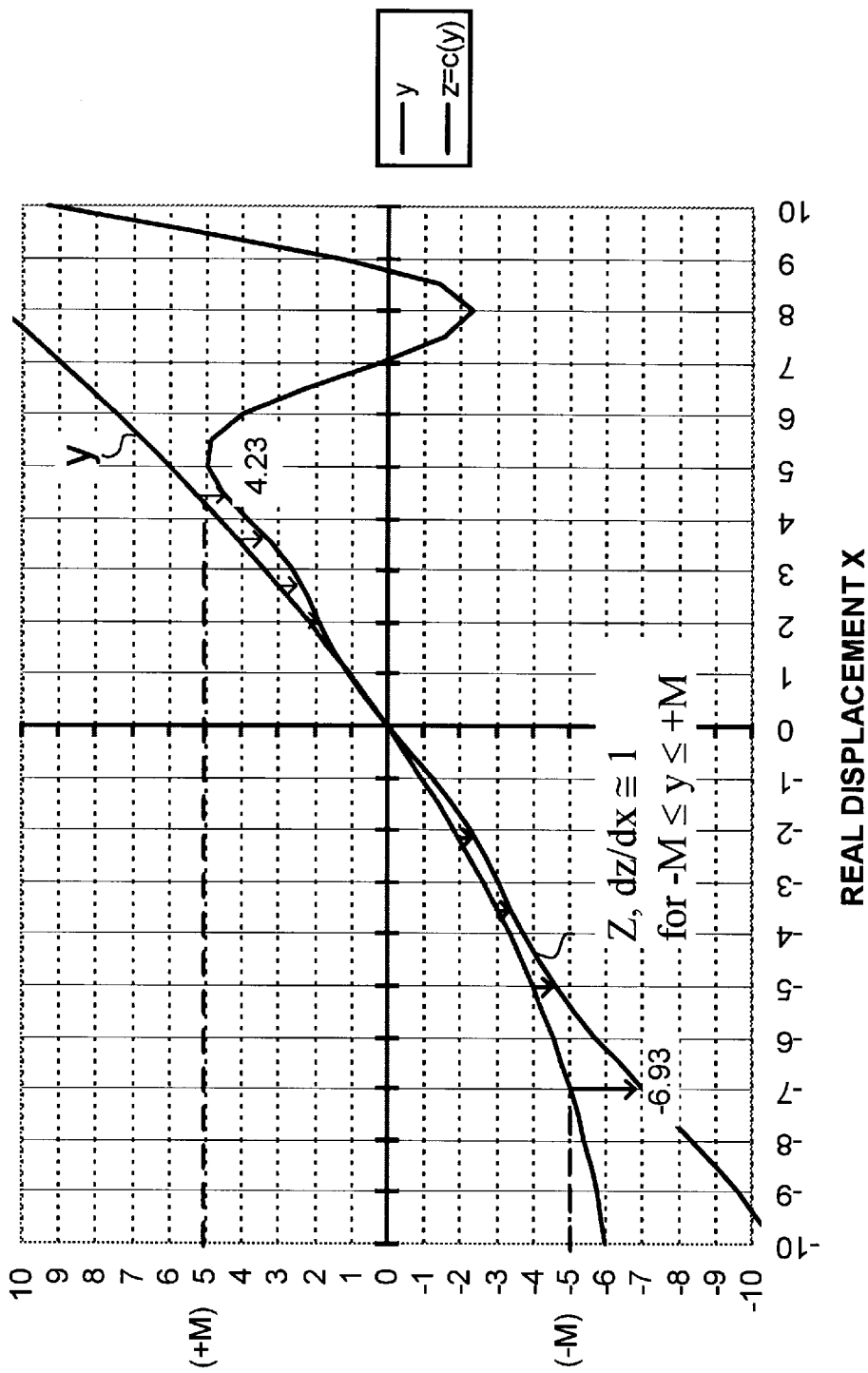
FIG. 9 is a graph of the measured displacement y and corrected displacement z as functions of real displacement x, showing that for all measured displacements y between $-M$ and $+M$ fractional track increments, $dz/dx \cong 1$.

As shown in FIG. 9, however, the present invention offers a method of calibrating the measured displacement y to produce a corrected displacement $z = c(y)$ where $dz/dx = 1$ for the range of real displacements x corresponding to the measured displacements y between −5 and +5. Significantly, this unique method establishes the correction function c(y) based only on a plurality L of measured displacements $y_i$ and a corresponding plurality of measured gains $g_i = dy_i/dx$. This method does not require knowledge of actual displacement x!

In this example, we have chosen to derive the corrected displacement z with a correction function c(y) carried out to the third order, i.e. using equation (6) where N=3:

$$c(y) = y + a_1 \cos(\omega y) + b_1 \sin(\omega y) + a_2 \cos(2\omega y) + b_2 \sin(2\omega y) + a_3 \cos(3\omega y) + b_3 \sin(3\omega y) = (a_1 + a_2 + a_3) \quad (15)$$

We need to make at least six measurements in order to determine the six unknown coefficients in the correction function c(y) of equation (15), i.e. we need $L \geq 6$. We have arbitrarily chosen to make thirteen measurements (L=13).

The method may proceed as follows: First, the MR head is positioned at the null point where the measured PES=0, at $y_7 = 0$, and the gain $g_7 = 1.00$ is measured. Ordinarily, as described above, the gain at this position would be measured and normalized to one. Here, however, our hypothetical MR head actually has a gain of 1.0 at the position where the PES=0. The head is then stepped to the right to displacement $y_8$ where gain $g_8$ is measured, to displacement $y_9$ where gain $g_9$ is measured, and so on. This measurement operation is then repeated to the left for displacement $y_6$ and gain $g_6$, displacement $y_5$ and gain $g_5$, and so on. We ultimately have thirteen measured data pairs:

TABLE 1

| i | $y_i$ | $g_i$ |
|---|---|---|
| 1 | −6 | 0.20 |
| 2 | −5 | 0.45 |
| 3 | −4 | 0.60 |
| 4 | −3 | 0.72 |
| 5 | −2 | 0.82 |
| 6 | −1 | 0.92 |
| 7 | 0 | 1.00 |
| 8 | 1 | 1.08 |
| 9 | 2 | 1.15 |
| 10 | 3 | 1.22 |
| 11 | 4 | 1.28 |
| 12 | 5 | 1.34 |
| 13 | 6 | 1.40 |

The gain values $g_i$ are measured in a known fashion using, as described above, a fixed frequency sinusoid. For purposes of this example, however, the gain values were calculated by using equation (14) to mathematically identify the real displacements $x_i$ corresponding to the measured values $y_i$, and then substituting each of the real displacements $x_i$ (not normally known) into the derivative of equation (14), i.e.

$$g = dy/dx = 0.015x + 1. \quad (16)$$

The measurements could be made in any order. In other words, $y_1$ could correspond to a measured y=0 and $y_2$ to $y_{13}$ could correspond to the other twelve measurements. We assigned the measured PES equals 0 to $y_7$, with the other measurements on either side thereof, so that the measured value y ranges from −6 to −1 for i ranging from 1 to 6 and from +1 to +6 for i ranging from 8 to 13.

As noted above, the matrix equation (13), $K_{LS} = (A^T A)^{-1} A^T F$, may be used to determine the best coefficients $K_{LS}$ by the Least Square method. Significantly, as noted above, all of the matrix values in the matrix product $(A^T A)^{-1} A^T$ in equation (13) are fixed upon selection of a measured displacement range (M), the number of measurements (L) and step size (if any) which establish the measured values $y_i$, and the order of the Fourier series (N). Accordingly, the matrix product $(A^T A)^{-1} A^T$ may be calculated in advance and stored within the drive for use.

Here, for example, given a measured displacement y range of −5 to +5 (M=5), thirteen measurements (L=13) made with a step size of 1, and a third order Fourier series (N=3), the matrix A of FIG. 5 is defined as a 13×6 matrix which takes on the fixed values shown in FIG. 10. The 6×13 matrix product $(A^T A)^{-1} A^T$ is obtained by performing standard matrix transposition multiplication, and inversion of matrix A. Accordingly, it also has fixed values and appears as shown in FIG. 11.

F is an L×1 (13×1) vector based entirely on the measured gain values $g_i$. In this example, F takes on the following values based on the gain values $g_i$ shown in Table 1.

TABLE 2

| | F |
|---|---|
| $1/g_1-1$ | 4.00 |
| $1/g_2-1$ | 1.24 |
| $1/g_3-1$ | 0.67 |
| $1/g_4-1$ | 0.39 |
| $1/g_5-1$ | 0.21 |
| $1/g_6-1$ | 0.09 |
| $1/g_7-1$ | 0.00 |
| $1/g_8-1$ | -0.07 |
| $1/g_9-1$ | -0.13 |
| $1/g_{10}-1$ | -0.18 |
| $1/g_{11}-1$ | -0.22 |
| $1/g_{12}-1$ | -0.25 |
| $1/g_{13}-1$ | -0.29 |

Multiplying the 6×13 matrix product $(A^T A)^{-1} A^T$ of FIG. 11 by the 13×1 vector F of Table 2 above, provides a 6×1 matrix $K_{LS}$ as follows:

TABLE 3

| | $K_{LS}$ |
|---|---|
| $a_1$ | 5.27 |
| $b_2$ | 1.43 |
| $a_2$ | -2.32 |
| $b_2$ | -1.62 |
| $a_3$ | 0.71 |
| $b_3$ | 0.85 |

Using the best fit coefficients from a matrix $K_{LS}$ in the correction function of equation (15) we have a correction function z=c(y) which will produce a corrected displacement z as shown in FIG. 9.

FIG. 9 shows the correction function z=c(y) of equation (17) in graphical form. As shown therein, the corrected displacement z is a function of measured displacement y for all y in the range of interest between -5 fractional track increments and +5 fractional track increments. The measured displacement y=1, for example, is translated to a corrected displacement z=0.49. The correction functions c(y) of equation (15) can be converted to a substitution table wherein the index of the table is a measured displacement y and the output of the table is the corrected displacement z.

III. Experimental Results

In an experiment made to empirically verify the validity of the present invention, a set of gain measurements $g(y_i)$= dy/dx at $y_i$ was made across the region where the measured displacement y or offset PES (expressed in fractions of a cylinder modulo 256 or $2^{-8}$ cylinders) was varied from $-60(2^{-8}$ cyl.) to $+60(2^{-8}$ cyl.) i.e. with M equal to 60. The step size in this experiment was $4(2^{-8}$ cyl.), rather than $1(2^{-8}$ cyl.), in order to reduce the number L of measurements from 121 to 31 and reduce the size of the corresponding matrices.

The order N was determined somewhat empirically. If the selected order N was made too small, we found that the correction function c(y) was subject to noise induced error. If the selected order N was made too high, we found that the matrices needed to calculate the coefficients of the correction function c(y) grew too large for practical purposes. In view of these competing concerns, the order N of the Fourier series is ideally somewhere between 3 and 9. Here, the order N of the partial sum Fourier series was set to 6.

Figure 3:
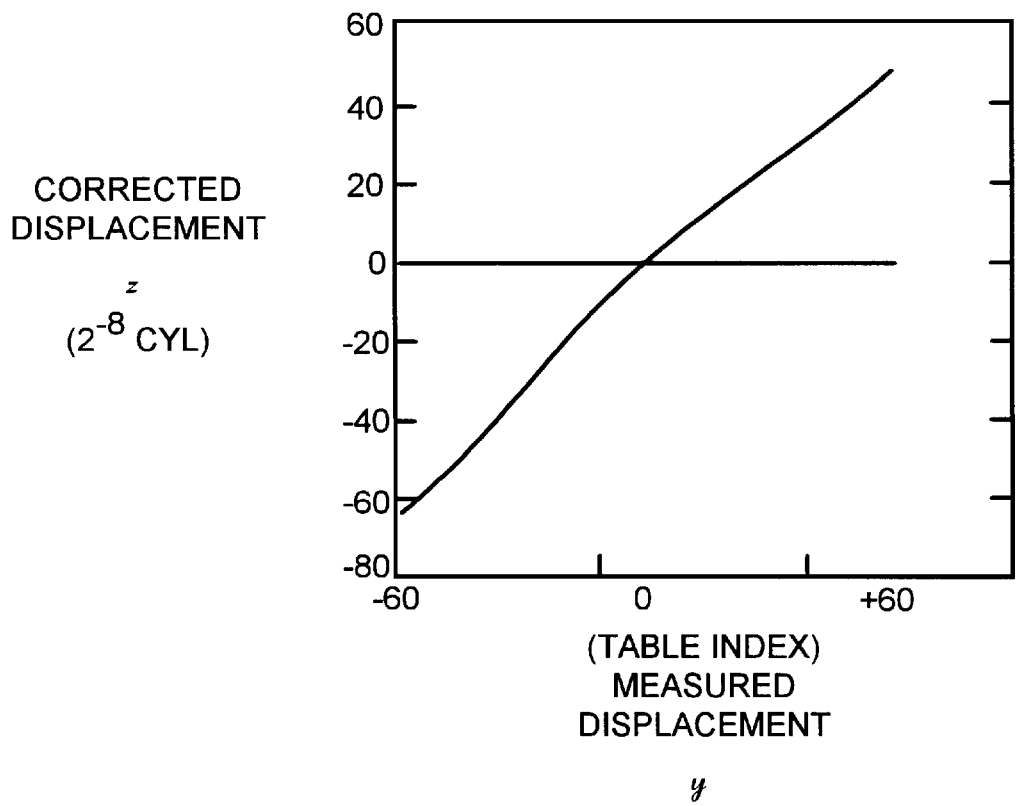
FIG. 3 is a graph showing the values in a correction table which implements a correction function $c(y)$ as shown in FIG. 2 wherein the horizontal index to the correction table is the measured displacement y in fractional track increments to either side of a null position of where the measured displacement y is zero and the vertical output of the table is the corrected displacement z in fractional track increments.

The measurements were analyzed with equation (13) to establish the best Fourier coefficients according to the Least Square Error method. Then, by using the correction function c(y) of equation (6) with these coefficients values, we obtained a correction table with values as shown in FIG. 3.

Figure 4:
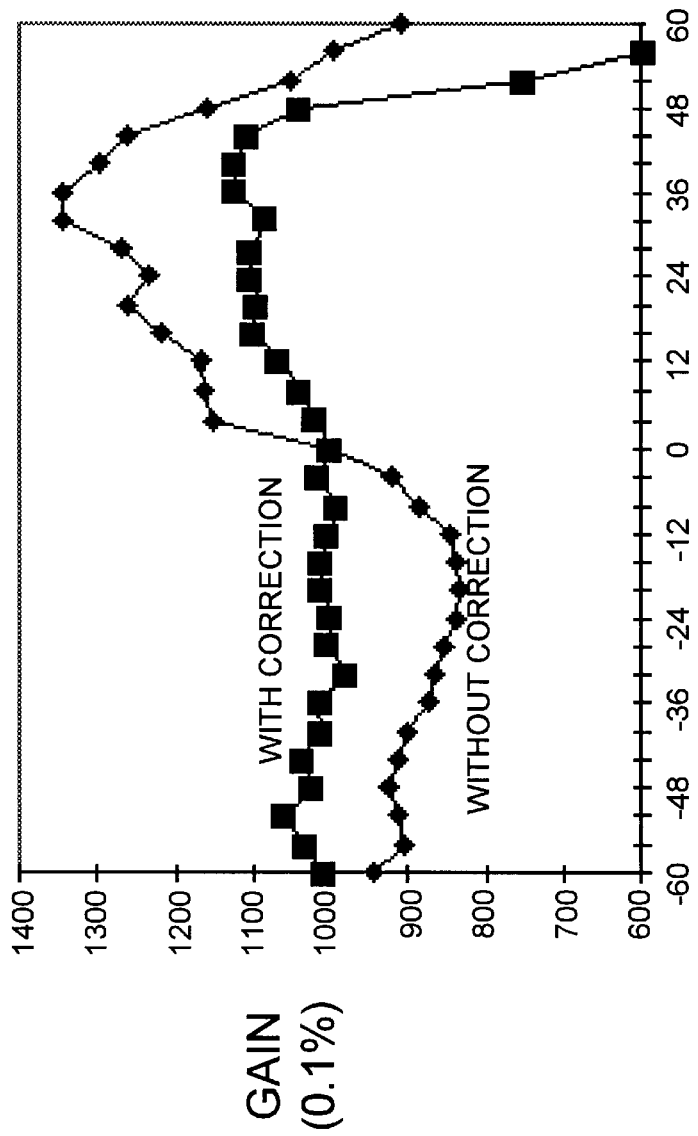
FIG. 4 is a graph showing the gain of an MR head without correction as it is positioned ±60 fractional track increments from where the measured PES=0 and the gain of that same MR head with correction.

FIG. 4 shows the gain of the MR head at measured displacements y of ±60 fractional track increments with and without correction. As shown, the gain of the MR head without correction deviates quite dramatically from unity, being as low as approximately 0.85 and as high as approximately 1.35. With correction provided in accordance with the correction table of FIG. 3, however, the gain of the MR head remains quite close to 1.0 throughout the range ±M of measured fractional track displacements. Accordingly, with correction according to the present invention, the MR head may be moved off track with some confidence that the corrected displacement z closely represents the actual displacement x.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

We claim:

1. In a servo control system for a magnetic disk drive comprising a magnetic disk having a pattern of servo bursts defining concentric data tracks, an actuator, and an MR head that is carried by the actuator adjacent the magnetic disk and that generates a measured displacement y (PES signal) which varies as a nonlinear function u(x) of physical displacement x from a null position at which the measured displacement y equals zero, a method of calibrating the measured displacement y to provide a corrected displacement z comprising the steps of:

positioning the MR head at a plurality of measured displacements y relative to the null position;

measuring a PES gain value g(y)=du(x)/dx where y=u(x) at each of the plurality of measured displacements y; and correcting the measured displacement y which varies as a nonlinear function of the physical displacement x to the corrected displacement z which varies substantially as a linear function of the physical displacement x based on the plurality of measured displacements y and corresponding PES gain values g(y).

2. The method of claim 1 wherein the correcting step comprises the step of establishing coefficients of a correction function c(y) using the plurality of measured displacements y and corresponding gain values g(y).

3. The method of claim 2 further comprising the step of creating a correction table based on the correction function c(y).

4. The method of claim 2 wherein the correction function c(y) is derived from a Fourier series.

5. The method of claim 4 wherein the Fourier series is a partial sum series of order N.

6. The method of claim 5 wherein N is in the range of 3 to 9.

7. The method of claim 2 wherein the step of positioning the MR head at a plurality of measured displacements y relative to the null position comprises the steps of positioning the MR head at the null position and at a plurality of positions to either side of the null position wherein the measured displacements y lie in the range of -M to +M fractional track increments.

8. The method of claim 7 wherein the correction function c(y) is derived from a partial sum Fourier series or order N.

9. The method of claim 8 wherein the correction function c(y) is derived relative to the measured displacement y by defining an intermediate difference function h(y)=c(y)-y such that c(y)=y+h(y).

10. The method of claim 9 wherein the correction function c(y)=y+h(y) is described by the equation:

$$c(y) = y + a_1\cos(\omega y) + b_1\sin(\omega y) + a_2\cos(2\omega y) + b_2\sin(2\omega y) +$$
$$\ldots + a_N\cos(N\omega y) + b_N\sin(N\omega y) - (a_1 + a_2 + a_3 + \ldots)$$

where $a_1, b_1, a_2, b_2, \ldots a_N, b_N$ are the Fourier coefficients and $\omega = \pi/2M$.

11. The method of claim 10 wherein the Fourier coefficients $a_0, a_1, b_1, a_2, b_2, \ldots a_N, b_N$ are selected by analyzing the values of a plurality L of correction functions c(y) based on corresponding plurality of measured displacements $y_1$ to $y_L$ and gain values $g(y_1)$ to $g(y_L)$.

12. The method of claim 11 wherein the Fourier coefficients $a_0, a_1, b_1, a_2, b_2, \ldots a_N, b_N$ are selected by analyzing the plurality L of correction functions c(y) and corresponding plurality of measured displacements $y_1$ to $y_L$ and gain values $g(y_1)$ to $g(y_L)$ in a matrix equation, F=AK, where $$F = \left[ \frac{1}{g_1} - 1 \quad \frac{1}{g_2} - 1 \quad \ldots \quad \frac{1}{g_L} - 1 \right]^T$$

$$A = \begin{bmatrix} -\omega\sin(\omega y_1) & \omega\cos(\omega y_1) & -2\omega\sin(2\omega y_1) & 2\omega\cos(2\omega y_1) & \ldots & -N\omega\sin(N\omega y_1) & N\omega\cos(N\omega y_1) \\ -\omega\sin(\omega y_2) & \omega\cos(\omega y_2) & -2\omega\sin(2\omega y_2) & 2\omega\cos(2\omega y_2) & \ldots & -N\omega\sin(N\omega y_2) & N\omega\cos(N\omega y_2) \\ \vdots & \vdots & \vdots & \vdots & & \vdots & \vdots \\ \vdots & \vdots & \vdots & \vdots & & \vdots & \vdots \\ \vdots & \vdots & \vdots & \vdots & & \vdots & \vdots \\ -\omega\sin(\omega y_L) & \omega\cos(\omega y_L) & -2\omega\sin(2\omega y_L) & 2\omega\cos(2\omega y_L) & \ldots & -N\omega\sin(N\omega y_L) & N\omega\cos(N\omega y_L) \end{bmatrix}$$

and $$K = [\, a_1 \quad b_1 \quad a_2 \quad b_2 \quad \ldots \quad a_N \quad b_N \,]^T$$

13. The method of claim 12 wherein the Fourier coefficients $a_1, b_1, a_2, b_2, \ldots a_N, b_N$ are determined by using the Least Square Error method according to the matrix equation $K_{LS} = (A^T A)^{-1} A^T F$.

14. The method of claim 1 wherein the step of measuring a gain value $g(y) = du(x)/dx$ of the MR head at the plurality of measured displacements y comprises the steps of:

positioning the MR head at each measured displacement y;

track following at the measured displacement y;

injecting a single frequency sinusoidal signal into the servo control system; and measuring a response of the actuator relative to the single frequency sinusoidal signal using a digital Fourier transform (DFT).

* * * * *